(12) United States Patent
Kewitsch (10) Patent No.: US 7,920,764 B2
(45) Date of Patent: Apr. 5, 2011

(54) ELECTRICALLY TRACEABLE AND IDENTIFIABLE FIBER OPTIC CABLES AND CONNECTORS

(76) Inventor: Anthony Stephen Kewitsch, Santa Monica, CA (US)

( * ) Notice: Subject to any disclaimer, the term of this patent is extended or adjusted under 35 U.S.C. 154(b) by 0 days.

(21) Appl. No.: 12/114,117

(22) Filed: May 2, 2008

(65) Prior Publication Data
US 2008/0273844 A1    Nov. 6, 2008

Related U.S. Application Data

(60) Provisional application No. 60/927,773, filed on May 4, 2007.

(51) Int. Cl.
 *G02B 6/44* (2006.01)
 *H04B 10/00* (2006.01)
 *G08B 13/14* (2006.01)
(52) U.S. Cl. ........ 385/101; 398/115; 398/116; 398/117; 398/113; 340/572.7
(58) Field of Classification Search .................. 385/101; 340/500, 505, 310.11; 398/115–117, 113
See application file for complete search history.

(56) References Cited

U.S. PATENT DOCUMENTS

| | | | |
|---|---|---|---|
| 5,910,776 A * | 6/1999 | Black | 340/10.1 |
| 6,808,116 B1 * | 10/2004 | Eslambolchi et al. | 235/492 |
| 7,526,582 B2 * | 4/2009 | Best et al. | 710/15 |
| 7,590,354 B2 * | 9/2009 | Sauer et al. | 398/115 |
| 2002/0126967 A1 * | 9/2002 | Panak et al. | 385/101 |
| 2007/0248358 A1 * | 10/2007 | Sauer | 398/115 |
| 2008/0100456 A1 * | 5/2008 | Downie et al. | 340/572.8 |
| 2008/0100467 A1 * | 5/2008 | Downie et al. | 340/686.2 |
| 2008/0122579 A1 * | 5/2008 | German et al. | 340/10.1 |
| 2008/0204235 A1 * | 8/2008 | Cook | 340/572.1 |
| 2008/0218355 A1 * | 9/2008 | Downie et al. | 340/572.7 |

OTHER PUBLICATIONS

"RFID: Frequency, standards, adoption and innovation" by Ward et al, JISC Technology and Standards Watch, May 2006.*

* cited by examiner

*Primary Examiner* — Ryan Lepisto
*Assistant Examiner* — Robert Tavlykaev (57) ABSTRACT

Composite fiber optic cables having exposed, conductive traces external to the cable jacket enable non-invasive, wireless electrical tone tracing of fiber optic cables. The cross sectional geometry of the fiber optic cable prevents conductive traces from short circuiting when abutting other cables or grounded conductive elements. Moreover, the structure allows convenient electrical contact to the conductive traces at any location along the longitudinal extent of the cable without requiring penetration of the cable jacket or removal of fiber optic connectors. Traceable fiber optic cables of various types are disclosed, including simplex, duplex and ribbon cables. Systems of traceable cables utilizing connectors with integrated electrical antenna elements attached to the conductive elements of cable and RFID tags for remote connector port identification are further disclosed.

12 Claims, 9 Drawing Sheets

ELECTRICALLY TRACEABLE AND IDENTIFIABLE FIBER OPTIC CABLES AND CONNECTORS

REFERENCE TO RELATED APPLICATIONS

This application is based on provisional patent application 60/927,773 filed on May 4, 2007 and entitled "Electrically Traceable Fiber Optic Cables".

FIELD OF THE INVENTION

This invention pertains to optical fiber cables and systems to transmit illumination and/or signals, and more particularly, to fiber optic cables which are electrically traceable and identifiable such that the inventory of physical fiber connections comprising a communications network can be determined by electronic and software means and to systems for electronic tracing of such cables.

BACKGROUND OF THE INVENTION

Fiber optic links can provide greater than THz bandwidths over long distances by transmitting one or more data streams at speeds in excess of 10's of Gigabits per second on a single fiber. Optical fiber offers several desirable characteristics, including low transmission loss, very compact size, light weight and relatively low cost. Nevertheless, the deployment of fiber optic cable does introduce challenges which make the installation, maintenance and operation of a fiber-based network demanding compared to the traditional copper-based network. Improved cabling and interconnect systems are required to address these challenges In particular, one attribute of copper-based cables which is deficient in fiber optic cables is the ability to wirelessly trace the physical locations and termination points of cables throughout a network; for example, along a cable tray or within wall and ceiling plenums. Traditional electrical tracing of copper cables is accomplished by connecting a radio frequency (RF) tone generator to one or two electrical conductors to energize the cable with a sinusoidal or square wave voltage signal in the frequency range of 500 Hz to 33 kHz. A weak electromagnetic signature at this characteristic frequency is radiated along the entire length of the wire, whereby the wire functions as an extended wire antenna in which the surrounding environment provides a common ground. This RF signal transmits through non-conductive walls, floors and ceilings with minimal signal strength attenuation and is detected by a wireless, handheld RF tone detector. A tone detector, such as the type marketed by Psiber Inc. and Test-Um Inc., typically includes a voltage probe that emits an audible tone when placed in the vicinity of a cable carrying the tone. This method of voltage tone detection is the standard for tracking electronic cables.

Electronic tone-tracing techniques are ineffective in locating fiber optic cables, as typical fiber optic cables do not incorporate the electrical conductors that are needed to transmit an RF tone. Certain types of composite fiber optic cables include conductors that are embedded within the cable jacket and are difficult to access in a non-invasive fashion. While fiber optic cables could, in principle, emit an optical signal along their entire length, in practice the optical attenuation of fiber optic cables is extremely low, typically less than 0.1 dB/km, and the leakage along its length is a small fraction of this. Optical detectors that physically clip on to fiber to produce a lossy microbend are one of the few alternatives to detect light within the fiber. As a consequence, present day optical detection techniques are unable to trace the fiber in a wireless fashion and can not be performed if the cable lies behind obstructions such as a wall, ceiling, floor or a bundle of cables.

For specialized tracing applications, composite cables with optical fiber and copper wire within a single coextensive outer jacket have been developed. However, the expense and non-standard processes required to both optically and electrically terminate, that is, add connectors to such cables, have restricted their use. Because the major component in the cost of the cable is the connector, these specialized cable assemblies are relatively costly. The injection of a suitably strong electrical signal into the cable requires that the cable jacket be physically cut or removed to gain access to the wires, potentially causing damage to the fiber optic cable and compromising its strength. This adds serious reliability concerns to the already fragile optical fiber medium.

U.S. Pat. Nos. 6,743,044, 6,905363 and 7,150,656 by ADC Telecommunications Inc. describe "tracer light" patchcords which include a pair of insulated electrical conductors within the cable jacket and utilize custom cable assemblies with dual electrical and optical connectors. The non-traditional cables and connectors only allow access to the conductors at the connectorized cable endpoints, unless the fiber optic cable jacket is partially removed by an invasive procedure. In addition, these cables are not well suited for on-site termination because they require a non-standard connectorization process wherein the individual optical fibers as well as the conductors are terminated. Therefore, standard quick termination connectors used for field connectorization are not applicable.

Alternately, U.S. Pat. Nos. 5,265,187 and 5,337400 by Morin et al. disclose a fiber optic cable distribution frame including optical connector holders with electrical circuits and LED's to enable both ends of any patchcord to be visually identified. The patchcords include internal electrical conductors providing power to the LED status indicators. Similarly, U.S. Pat. No. 5,666,453 by Dannenmann describes a fiber optic jumper cable including a pair of insulated, electrical conductors and electrically powered light emitting diodes integrated into the fiber optic connectors.

Additional implementations of composite electronic-optical cables are described in U.S. Pat. No. 6,456,768 and in UK Patent application 2354600A by Weatherly. The latter application discloses a cable consisting of an individual or pair of optical fibers with an internal metal tracing element, whereby a tracing signal may be injected at one end of the cable and detected at the other end of the cable. The tracing element is located beneath the outermost jacket. Again, an invasive approach is required to access internal electrical conductors. RFID tags have been proposed to label the endpoints of cables, and present day techniques are adequate to manually read the identification of such tags using a handheld reader brought in close proximity to tag.

The ability to trace the physical location of fiber optic cables in a convenient and low cost fashion is an increasingly important feature of interconnect systems in today's networks. Moreover, the integration of cable tracing and identification with the network's Operations Support Systems (OSS) is a key enhancement enabling the remote and automated management and inventory control of physical connections with a fiber optic network

SUMMARY OF THE INVENTION

It is the object of this invention to provide fiber optic cables that include unique design features for readily locating and identifying fiber optic cable and its termination locations. We disclose fiber optic cables with external, continuous and conductive traces provided within physically recessed channels formed in the outer surface of the cable jacket. The one or more recessed conductors are immune to short circuits and crosstalk upon physical contact with other cables or grounded conductive elements such as cable raceways, yet they are readily contacted in a non-invasive fashion at any point along their length by attaching a cable clip. Such traceable fiber optic cables of various types are disclosed, including simplex, duplex and ribbon cables.

It is a further object of this invention to provide intelligent interconnect systems based on electrically conductive fiber optic cables in conjunction with electronic identification means such as radio frequency identification (RFID) tags. For instance, the pair of external conductors coextensive with the optical fiber can serve as a feeder line connecting to a remote antenna coil incorporated with the cable connector, wherein remote RFID tags attached to distant terminal equipment and in close proximity to the connector's antenna coil at the distal end of traceable cable can be electronically read via the cable's conductors at its proximal end. By applying this identification process to a multiplicity of cables within a network, the termination locations of these cables to transmission equipment within the network can be automatically inventoried and managed during moves, adds and changes to the network.

BRIEF DESCRIPTION OF DRAWINGS

FIGS. 6 (A) through (D) illustrate examples of fiber optic connectors with integrated antennas to excite and read RFID tags located in the vicinity of connector, and FIGS. 7 (A) through (H) are cross section views of various examples of electrically traceable cables in accordance with this invention.

DETAILED DESCRIPTION OF INVENTION

In this invention, we disclose electrically traceable and identifiable fiber optic cables including one or more externally accessible conductive elements disposed within one or more concavities in the outer surface of the cable jacket, the concavities being longitudinally coextensive with the cable length and parallel or spirally arranged relative to the internal optical fiber. Electrical isolation of these uninsulated conductors, when in contact with other conductive elements, is maintained by fixedly attaching each conductor to a channel region bounded above by a tangential surface joining high points on the cable jacket surface and below by the depression in the cable jacket surface. The electrical isolation resulting from this structure prevents stray electrical conduction between adjacent conductive surfaces or bodies, such as other cables or grounded conduits, while enabling non-invasive electrical contact to the conductor(s) at any point along the length of the cable. This aspect of non-invasive electrical contact significantly reduces the complexity and cost of systems to trace and identify fiber optic cable.

Figure 1:
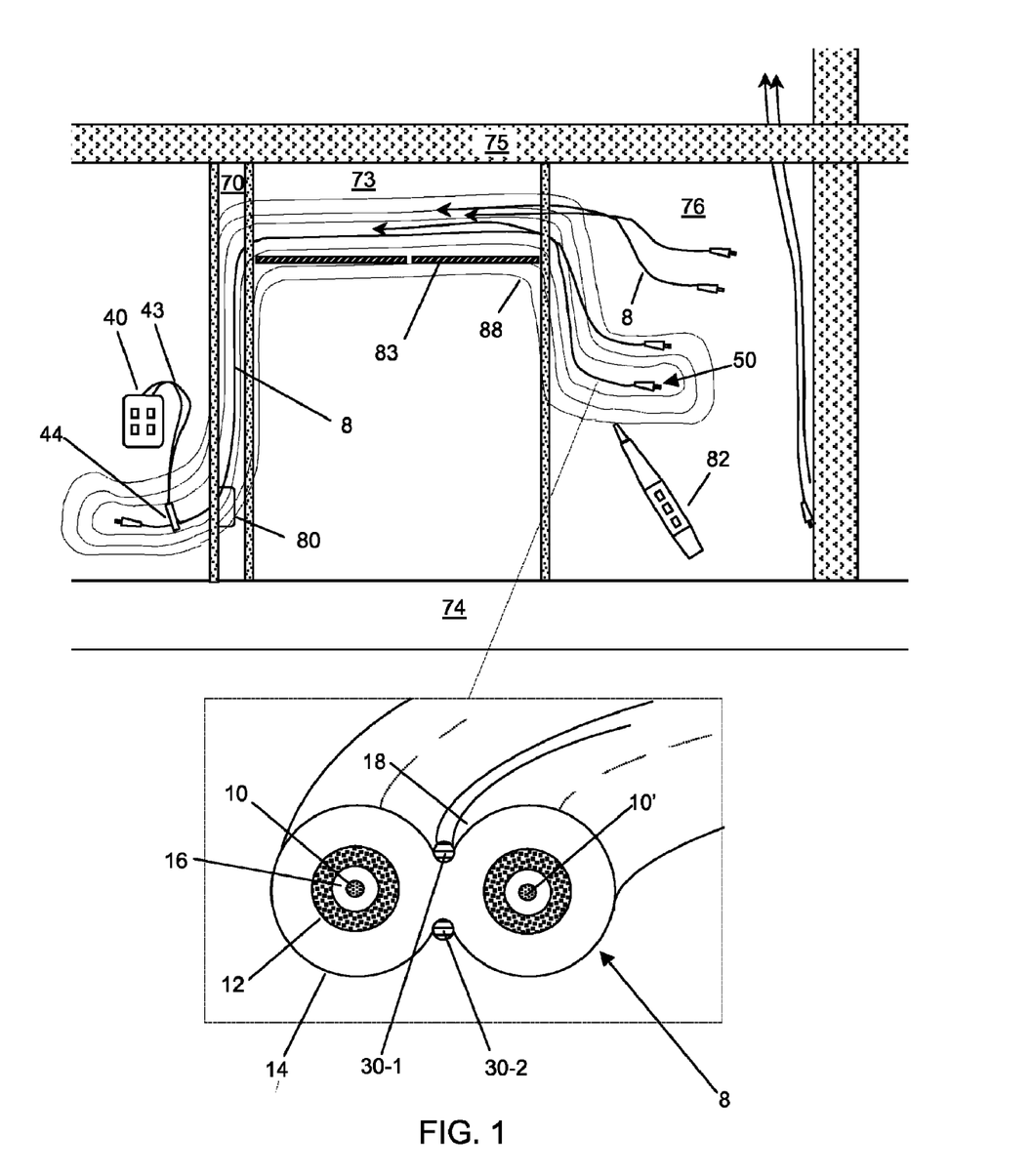
FIG. 1 illustrates a network incorporating traceable conductive fiber optic cables, including an inset detailing the cross section of a duplex style fiber optic cable with exterior conductive traces formed on the cable jacket.

As illustrated in FIG. 1, the conductive element(s) 30 are conveniently energized by clipping the test lead(s) 43 of an electronic tone generator 40 at any point along the longitudinal extent of the traceable cable 8 and making directive conductive contact with the exterior conductive element(s) 30-1, 30-2, thereby eliminating the usual need for cable penetration, stripping or cutting, as would be required for conductors internal to cable jacket. The tone generator 40 launches an oscillatory electrical signal, typically an RF voltage signal with a 1 to 24 volt amplitude, from the contact point with cable and longitudinally outward towards the endpoints of the electrically traceable cable 8.

The radiated power for an RF signal propagating along conductor(s) 30-1, 30-2 is typically greater than 0.5 dB/km so a detectable RF electromagnetic signature at a characteristic frequency is emitted along the longitudinal extent of the cable and can be wirelessly detected. In contrast, by virtue of its low loss optical transmission characteristics, optical power leakage from unperturbed optical fiber 10 is less than 0.5 dB/km, making optical detection along its length extremely difficult. Therefore, the physical location of traceable fiber optic cable 8 and its endpoints can be ascertained by a wireless tone detection probe 82, even if the intervening length of cable is physically obscured.

Fiber optic cables are commonly routed within walls 70 and above ceiling tiles 83 in ceiling plenum 73 to interconnect remote users to a networking hub, network element or patch-panel. For example, in a typical enterprise network, a multiplicity of cables 8 terminated in fiber optic connectors 50 converge on a central location. Tracing and identifying cables within this massing of large numbers of independent yet physically indistinguishable cables is challenging and time-consuming.

In accordance with this invention, cable and connector identification is facilitated by providing traceable fiber optic cable elements for which an RF voltage tone generated by a tone generator 40 and transmitted to fiber optic cable 8 through a non-invasive clip-on electrical contactor 44 attached at any point along the longitudinal extent of the cable. Thereby, the entire length of cable 8 radiates a signal 88 with an RF frequency signature detectable by the handheld wireless voltage tone probe 82 placed in the vicinity (e.g., <1 meter) of an electrically excited cable. The probe 82 typically incorporates a compact antenna element attached to a high input impedance transistor or amplifier to detect the weak RF field in the vicinity of the cable and convert it into an audible tone or visual indicator of signal strength.

The inset to FIG. 1 details the cross-sectional structure of a particular embodiment of an electronically traceable duplex fiber optic cable. In this example, the duplex fiber optic cable 8 has a substantially dumbbell-shaped cross section with minor axis dimension of 1.6 to 3 mm and major axis dimension of 3.2 to 6.2 mm. The cable includes two optical fibers 10, 10' comprised of 0.125 mm diameter glass fiber with a 0.250 mm diameter acrylate coating. The coated optical fibers are surrounded by a tight buffer tube 16 of 0.5 to 0.9 mm outer diameter. The buffered optical fiber is circumferentially surrounded by aramid strengthening yard 12 and is encased by the extruded pvc jacket 14. Two bare copper wires 30-1, 30-2 of round cross section and 0.075 mm diameter (40 gauge) are partially embedded within concave recessions 18 formed in the flexible plastic jacket 14 and longitudinally coextensive with the cable. The typical length of such cables range from 1 meter to 10 km. This particular cable type is commonly referred to as a duplex "zipcord", referring to its ability to be "unzipped" into two separate simplex cables without damaging the jackets surrounding the constituent fibers.

Figure 2:
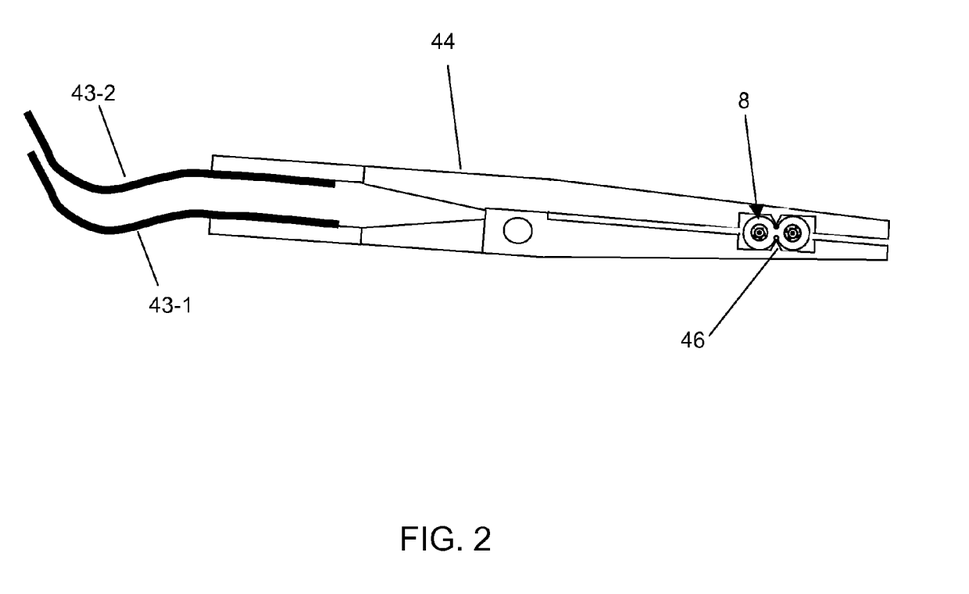
FIG. 2 illustrates an example of an electrical contact device to insert an electrical tone onto fiber optic cable in a non-invasive fashion at any location along the cable.

Electrical continuity between the tone generator and the cable is provided by a non-invasive clip-on electrical contactor that does not mechanically stress the internal optical fibers. For example, the clip 44 illustrated in FIG. 2 obviates the need to strip, cut, or otherwise penetrate the cable jacket, thereby preventing exposure of the delicate optical fiber. The clip 44 is attached to one wire 43-1 or both wires 43-1, 43-2 from the tone generator 40, each wire individually connected to one or both contactors 46 to provide direct conductive coupling. The contactors 46 are formed with a rounded tip and thickness sufficient to extend into the concave channels 18 bearing conductive elements 30-1, 30-2 without damaging the cable. The spring-load on contactors 46 is sufficient to make direct, low resistance conductive electrical contact with cable.

Figure 3:
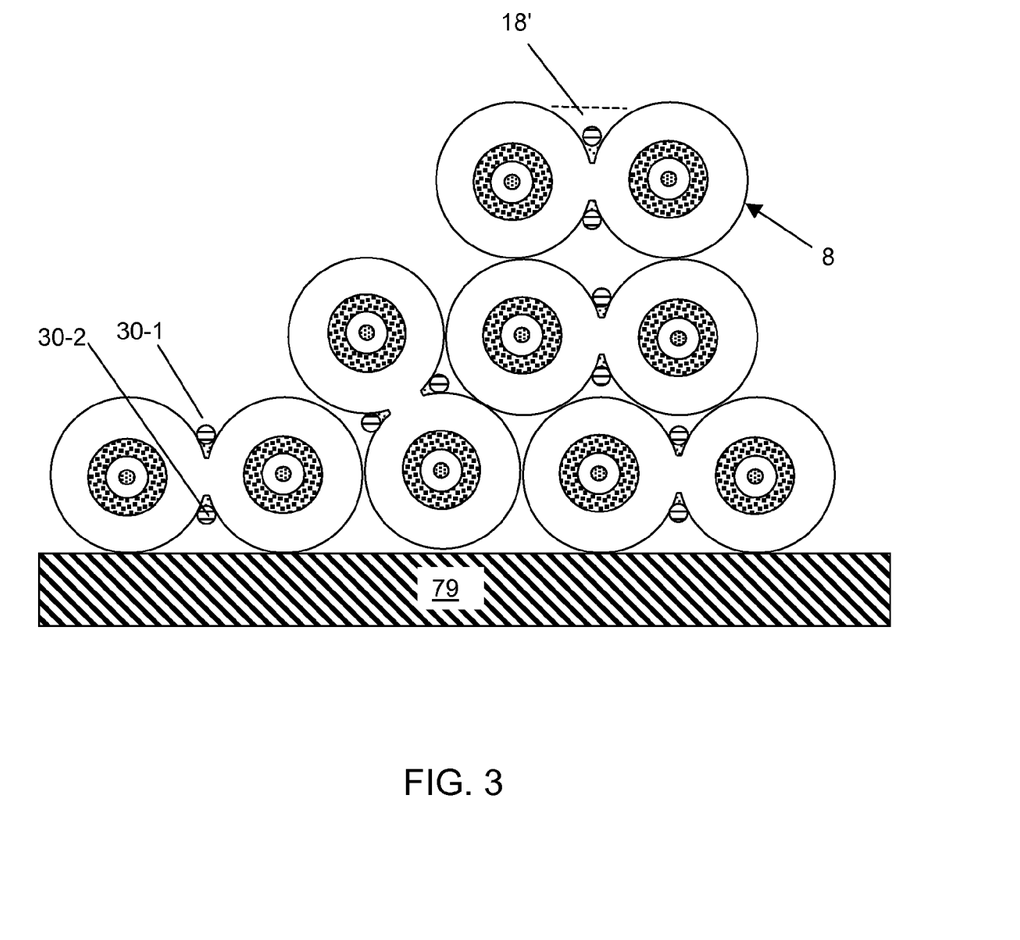
FIG. 3 depicts a bundle of non-shorting traceable fiber optical cables in cross section.

FIG. 3 depicts a cross sectional view of a multiplicity of bundled and stacked, duplex style traceable fiber optic cables 8 supported along their lengths by a cable raceway 79. The individual conductive elements 30-1, 30-2 are non-shorting with the conductive elements of adjacent bundled cables as well as non-shorting to cable raceway 79, which is potentially a grounded metallic surface. The unique placement of conductors within this cable structure thereby eliminates electrical crosstalk and allows the electrical tone to travel down the entire length of the cable without leaking to other conductors and producing a false identification. Moreover, this structure prevents electrical shorting to ground along the cable, which would prevent the launch of a voltage tone.

The traceable cable cross-sectional design is guided by mechanical considerations of buckling during cable bending. The tendency of the conductive element to delaminate or buckle relative to the cable jacket 14 during bending of the cable is substantially reduced by suitable sizing of the cable major and minor axes (FIG. 4), precise positioning of the conductive elements and selection of suitable attachment method of a conductor to the cable exterior.

Figure 4:
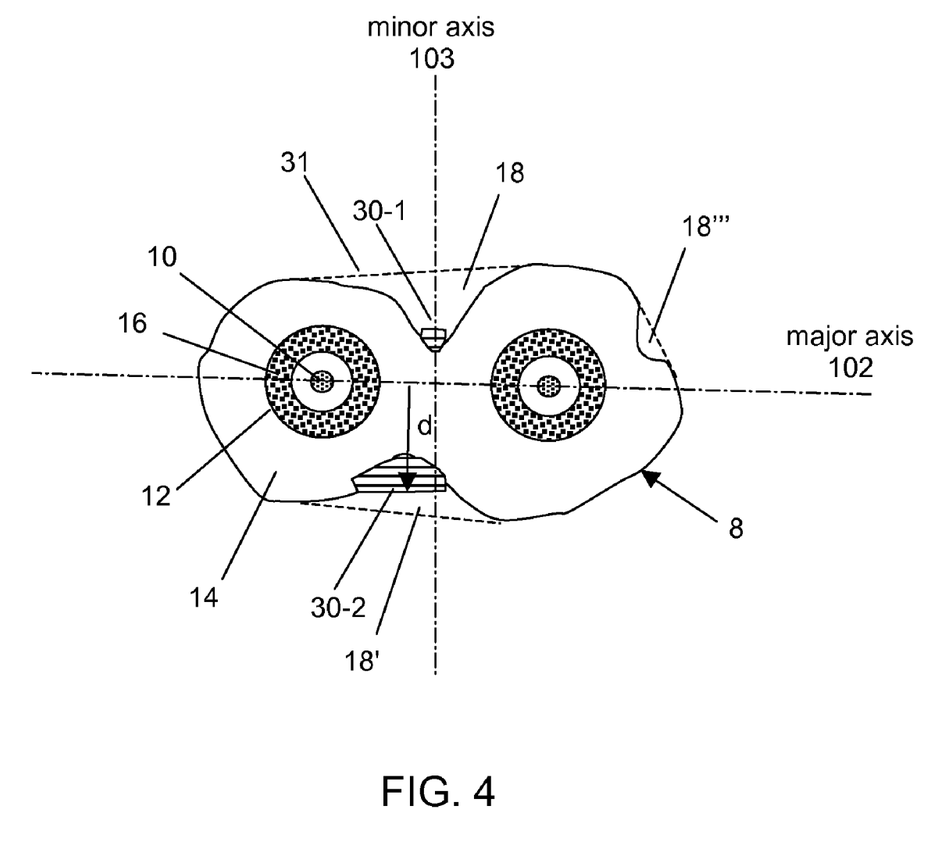
FIG. 4 is an abstracted representation of an arbitrary, duplex conductive fiber optic cable including concavities configured to accommodate recessed, non-shorting conductive traces.

The compressive and tensile stress exerted on conductive elements during bending are reduced by minimizing the distance d between a conductive element 30 and the major axis 102 of the cable 8. Duplex cables bend predominantly about the major axis due to the reduced geometrical rigidity of the cable jacket perpendicular to this direction. Equivalently, the moment of inertia about the major axis is smaller than the moment of inertia about the minor axis. As a result of the cross sectional asymmetry, the conductors lie very close to the major axis of the cable, thereby minimizing the tendency of conductors to buckle relative to the jacket.

In general, one or more conductive elements 30-1, 30-2 may be located within one or more concave channels 18, 18' and 18". Moreover, the cable cross-section may have an arbitrary shape. The form of concave channels 18, 18', 18" is preserved along the longitudinal extent of the cable and are sized to retain un-insulated electrical conductors below the tangential cable surface 31 in a non-shorting fashion.

EXAMPLE

Figure 5:
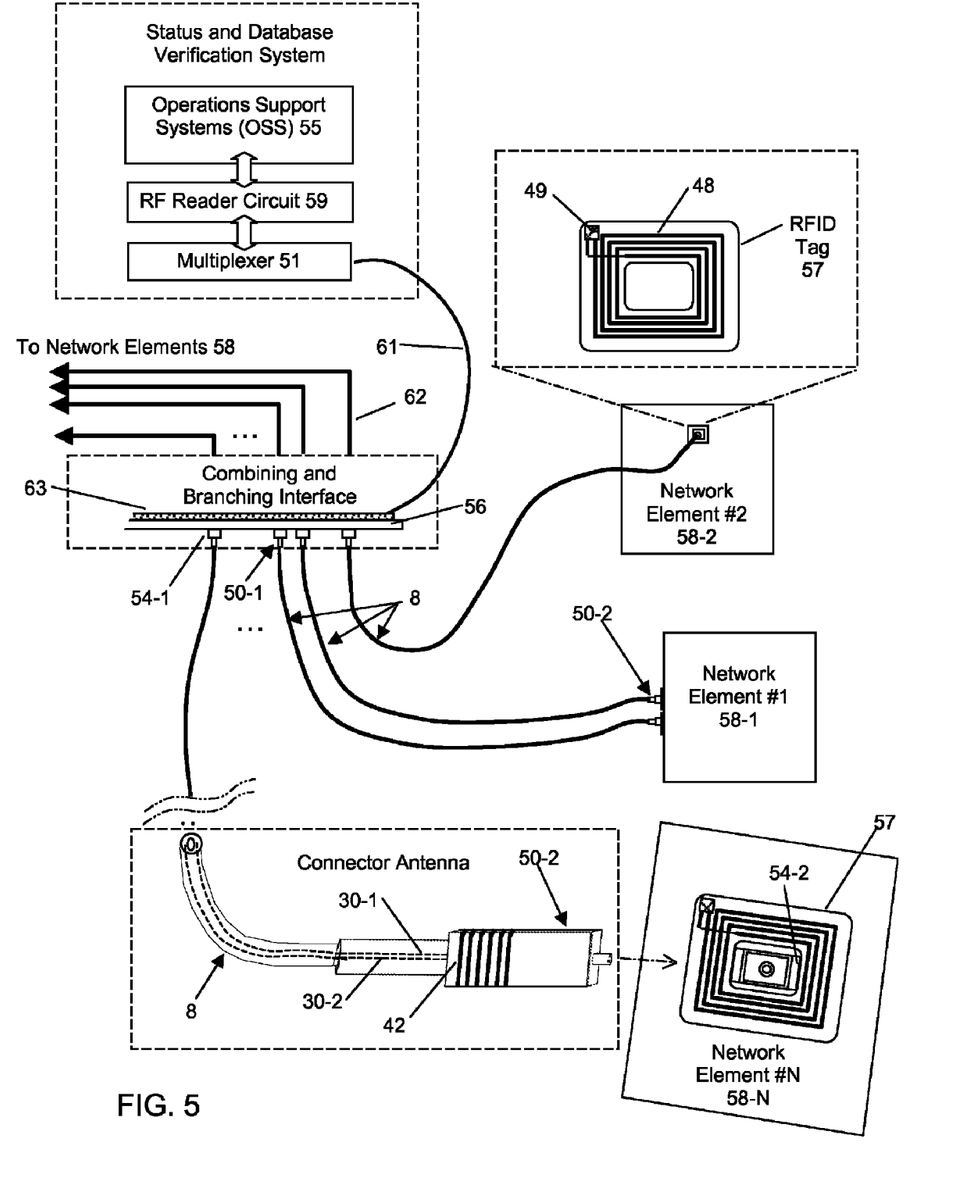
FIG. 5 schematically illustrates a system of electrically identifiable fiber optic interconnects.

Electronic System to Automatically Determine Physical Connections of Fiber Interconnects In a particular embodiment of the invention, we disclose a system comprised of traceable fiber optic patch cords, electromagnetic radiating fiber optic connector elements, electrically responsive, wireless identification tags and a multiplexed reader circuit. This system automates several tasks within the physical layer of a communications network that are currently performed manually. In particular, the endpoints of individual physical interconnections are electronically ascertained and recorded to enable an accurate, real-time inventory of connections (FIG. 5). This inventory is necessary to accurately guide subsequent reconfiguration and provisioning. Such monitoring is typically not provided by optical means because of the substantial costs associated with generating and detecting an optical monitor signal.

In accordance with this invention, the determination of physical network connections requires electronically traceable fiber optic cables whose conductors are attached at one end to an electrically radiating connector element. The radiating element is a linear 41 or coil 42 antenna element at the distal end of cable 8, which communicates wirelessly with an RFID tag 57 or other wireless interface (e.g., Bluetooth). For example, RFID tags and antenna designs are described extensively by, for example, Y. Lee, Microchip Technical Note AN710, "Antenna Circuit Design for RFID Applications", Microchip Technology, 2003.

Passive RFID tags 57 such as that shown magnified in FIG. 5 are typically energized by the current induced in substantially planar or cylindrical antenna coil 48 by coupling to a particular reader coil 42 on connector 50-2 driven with a time varying current. The RFID tag 57 comprises an integrated circuit element 49 attached to the coil 48, wherein the circuit element rectifies the time varying induced voltage to power the same circuit 49. The DC voltage must reach above a minimum value for the chip to activate. By providing this energizing RF signal, an RF reader circuit 59 can communicate with a localized tag 57 that has no internal power source such as a battery.

Energizing of and communication with the tag 57 requires efficient coupling between the substantially coaxial antenna coils of the reader and tag. An RF signal can be radiated efficiently if the linear dimension of the antenna is comparable with the wavelength of the operating frequency. For typical passive tags such as those from Microchip Technology Inc., the wavelength at their operating frequency of 13.56 MHz is 22.12 meters. Practical RFID tags and readers are made many orders of magnitude more compact by exploiting the resonance response of LC circuits.

Efficient sub-wavelength RFID antenna designs are based on a small loop antenna 48 and silicon integrated circuit 49 that is resonating or oscillating at a particular RF frequency by tailoring the inductance L and capacitance C of the circuit. For such a magnetic dipole antenna, the current i flowing through the coil generates a near-field magnetic field that falls off with distance r as $r^{-3}$. For 13.56 MHz passive tag applications, the inductance of the coil is a few microhenries and the resonant capacitor is a few hundred pF.

The coupling between the coil 48 of the tag and one of the multiplicity of reader coils 42, selectable by multiplexer circuit 51 and activated by reader 59, is analogous to a transformer comprised of primary and secondary coils. As a result, a voltage in the reader antenna coil is coupled to the tag antenna coil and vice versa. The efficiency of the voltage transfer at a particular RF frequency is increased significantly by providing coils with high quality factor (Q) LC circuits to resonantly enhance the magnetic coupling. The unique electronic identifier of the tag is transmitted, typically in a digital and time sequential representation, on an RF carrier at or near this particular frequency and this signal is processed by the reader circuit to extract the tag identifier.

An additional contribution to the inductance and capacitance of the reader circuit results from the finite length of the intervening traceable cable 8, whose electrical elements 30-1, 30-2 are equivalent to an RF transmission line with their own inductance and capacitance per unit length. Since there is typically a large variation in the length of cables within the network, in certain implementations it is advantageous for the reader circuit 59 to provide adaptive impedance or signal characteristics to maximize the coupling of the distant reader coil 42 under variable conditions in intermediate cable length and cable type.

As magnified in the lower portion of FIG. 5, the traceable fiber optic cable 8 with conductor pair 30-1 and 30-2 carries an excitation voltage generated by the RF reader circuit 59 and directed by multiplexer switch 51 to one of a multiplicity of reader coils 42, each integrated with a connector 50-2. For example, the reader coil 42 is coupled to the tag coil 48 associated with the mating connector receptacle 54-2 of network element 58-N. Passive, self-adhesive RFID tags 57 circumferentially surround connector ports 54-2 of the multiplicity of network elements 58-1, 58-2, . . . 58-N. Such network elements include transceivers, test equipment, multiplexers, high-speed packet routers, fiber amplifiers and optical signal processors such as dispersion compensators. Such networks typically include 100's to 100,000's of separate fiber optic patch cords 8.

The electronic identifier transmitted by the tag is associated with a description of each particular port of each particular network element within the communications network by the network element inventory database. Any changes to the network must be reflected in this database. Subsequent reading of an electronic identifier through a traceable fiber optic cable and lookup within the network's database reveals the connectivity of physical interconnections within the network. The total number of such interconnections for telecommunications networks can exceed 10's of million. Therefore, it is of great practical importance that each port of each network element is identified and RF tagged during installation and the inventory of connections are updated in real time should future moves, adds and changes (MACs) affect the disposition of the cable. This feature eliminates stranded, lost or misidentified fibers.

A single RFID reader circuit 59 may be switched among any of a multiplicity of traceable cables 8 by multiplexer circuit 51 to singly address one cable at a time. The reader circuit 59 outputs an excitation signal into that traceable cable 8 selected by the multiplexer circuit 51 and receives identification signal from the particular tag in proximity to the distal connector 50-2 of that particular cable. An RFID tag 57 located in the vicinity of the distal traceable cable end thereby electrically communicates through the intervening length of traceable cable 8, the cable serving as an electronic communications conduit that relays the cable configuration information through the multiplexer 51 and RFID reader circuit 59 back to the network's OSS 55.

The electronic overlay system described herein enables remote and real-time tracking, tracing and testing of individual physical fiber optic connections within a network with a substantial number of interconnections. Typically, as shown in partial cutaway view in FIG. 5, the cable interface 56 is a manual patch-panel or automated fiber optic cross-connect having an array of fiber optic bulkhead adapters 54 including exterior facing mating receptacles disposed partially or fully on the panel front-side. These front panel receptacles include both electrical and optical contacts, wherein the electrical contacts communicate with the electrical conductors of the traceable fiber optic cable 8 and the optical contacts provide low insertion loss optical transmission. Such electrical contacts may include physically contacting conductive pad and brush or pin and plug type electrical connectors. Behind the cable interface surface 56, electrical transmission element(s) 61 are separated from the optical transmission elements 62 by use of an electronic interconnect layer 63 interposed between connector ports 54-1. The interconnect layer 63 may be a flexible electronic circuit on a kapton substrate, for example. In a further example, the multiplexer 51 may be integrated with the interconnect circuit layer 63 to minimize the number of conductors comprising element 61.

To wirelessly read an RFID tag adjacent to the traceable cable, the electromagnetic signal should be sufficiently strong to unambiguously communicate with the tag. This is accomplished by forming a coil 42 or linear 41 antenna at the distal cable connector 50-2 which is sufficiently compact to fit on existing cables and connectors, while providing a local field strength adequate to both excite and read only the local RFID tag 57 attached to a port 54-2 the network element 58-1. The relative orientation of the antenna coil elements are substantially coaxial to maximize the electrical coupling.

Figure 6:
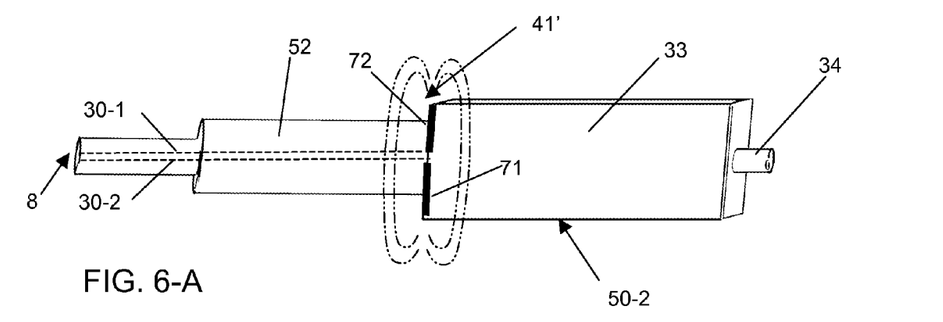

Additional examples of electrically radiating connectors are illustrated in FIGS. 6-A through 6-D. The conductors 30-1, 30-2 of the traceable cable 8 are terminated at the distal connector 50-2 in a linear antenna 41', 41", 41''' or coil antenna 42. The connectors are comprised of a polished fiber optic ferrule 34, connector body 33 and flexible boot 52 attached to endpoint of cable 8. Conductors 30-1, 30-2 provide a continuous current path carrying the RFID reader's 59 excitation signal from the proximal 50-1 to the distal connectors 50-2 and carrying the RFID tag 57 identification signal from the distal connector back to proximal connector. The conductors 30-1, 30-2 lie external or internal to the jacket of the traceable cable. The traceable cable functions as an electronic "tentacle" which enables an RFID circuit to read the distant tags and thereby ascertain the physical connections of the network.

In a particular example illustrated in FIG. 6-A, a dipole antenna 41' is comprised of dipole elements 71 and 72 attached the connector body 33 and in communication with conductors 30-2 and 30-1, respectively. The field lines, represented by dotted-dashed lines, are substantially parallel to elements 71 and 72. The conductors comprising the antenna in this and in the following examples are advantageously coated or covered with a non-electrically conductive material to prevent unintentional electrical shorting.

In the example of FIG. 6-B, shown in side view and cross section A-A through boot 52, the antenna 41" is integrated with the flexible boot. The antenna element consists of a partial cylindrical conductor surface 74 attached to wire 30-2 and a substantially linear conductor 73 attached to wire 30-1.

FIG. 6-C illustrates an alternate example in which the ground plane 76 and dipole element 75 are integrated within the connector body 33.

A further example with an antenna coil comprised of multiple turns of conductor 77 forming a spiral around the connector strain relief boot 52 is illustrated in FIG. 6-D. In general, the conductor may alternately follow a serpentine path on or beneath the boot surface. Both ends of conductor 77 are attached to conductors 30-1 and 30-2 within or on the jacket of the composite fiber optic cable 8. A current i passes through the conductor 30-1 into the coil 42 and returns via a second conductor 30-2 on or within cable 8, thereby generating a field in the vicinity of distal connector 50-2 that can excite and read an RFID tag adjacent to this connector. This coil element 42 is produced by molding the strain relief boot 52 about a spiral wireform, for example. The conductor loops 32 comprising the coil lie on the outside, interior, or embedded within the strain relief boot 52. Additionally, the coil may be located on or within a plastic housing forming the rigid connector body 33 that surrounds the optical fiber ferrule 34, as illustrated in FIG. 5. Composite cables with two conductors are typically utilized in this embodiment.

EXAMPLE

Duplex Traceable Fiber Optic Cables

Figure 7:
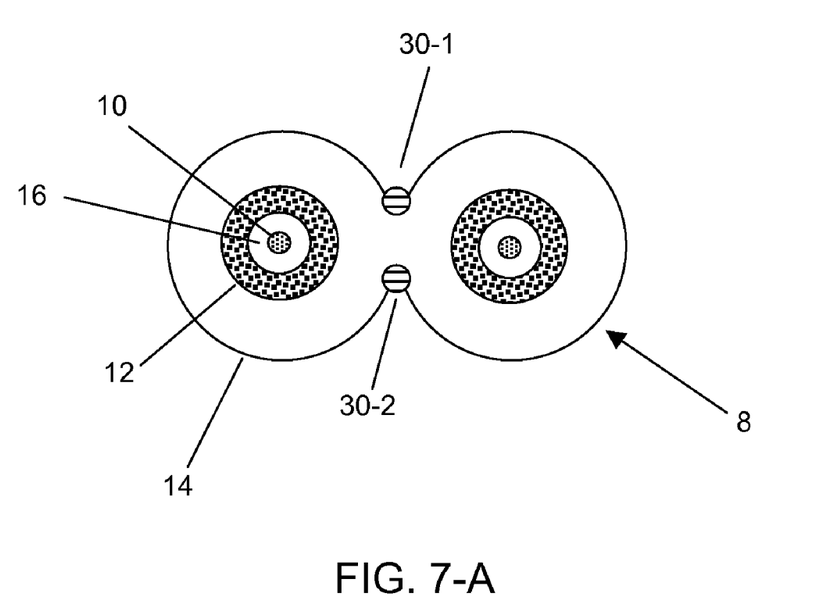

In a further aspect of the invention, we disclose traceable fiber optic cables in the form of duplex zipcord cables comprised of two multimode or single mode fibers. FIG. 7-A illustrates the duplex cable 8 in cross section, detailing the multiple concentric layers including the polyvinyl chloride (PVC) cable jacket 14, aramid yarn 12 for pull strength and bend resistance, tight buffer coating 16, and acrylate coated optical fiber 10. In addition, the conductive surface of conductive wires 30-1, 30-2 (40 gauge or 75 micron diameter copper) partially embedded in cable jacket are fully or at least partially exposed. Such cables 8 typically have cross sectional dimensions of 1.6 mm to 3 mm along the minor axis and 3.2 mm to 6 mm along the major axis. The glass portion of the fiber optic cable 10 is typically 80 to 125 microns in diameter with an acrylate coating of 250 micron thickness. Surrounding each fiber optic element is a tight buffer coating or loose tube 16 which provides additional strength.

In an additional cable implementation, the fiber optic jacket 14 can be printed or co-extruded such that the concave channel includes a continuous line, ribbon or fillet 30-1 comprised of conductive dye or polymer (FIG. 7-B). For example, Dow Corning PI-2000 conductive ink may be utilized. This silver polymeric interconnect material exhibits a sheet resistance of 8 to 81 miliohms per square for 25 micron print thickness. For comparision, copper has a sheet resistivity of 0.68 miliohms/square for a 25 micron thickness. Despite the larger resistance of these conductive compounds, a 30 meter long cable with 1 mm wide trace 25 microns thick would have a resistance of 244 ohms total. In many applications, the tracer conductors are open circuited at one end 50, so this increased resistance has little or no impact on the ability to launch a voltage tone signal down the cable.

Since the cable 8 is printed with a thin conductive layer on its exterior, a technician can excite a tone in the cable in a non-invasive fashion and will not need to strip or remove the jacket 14 to gain access to internal conductors, as is necessary in the prior art. This is an important practical advantage in deployments of fiber optic cable because such penetration of the cable jacket weakens the cable, degrades cable integrity and can eventually lead to loss of optical transmission.

FIG. 7-C illustrates a cable 8 with a dog-bone shaped cross section incorporating recessed conductive element 30-1 located at the midpoint of the line joining the centers of the two optical fibers 10 and 10'. The conductive element 30-1 is positioned at a central point of the cable such that the tendency of the conductor to buckle relative to the jacket is minimized during cable bending. If the conductive elements were not located at the geometrical center of the cable, bending would potentially cause buckling of the conductive elements, for example a fine diameter wire, relative to the cable jacket. For a wire located 0.5 mm from the central axis of the cable, a 30 mm minimum bend radius would subject the wire elements to an elongation of <1.5%. Copper wire in the range of 38 to 75 microns diameter can typically elongate in the range of 10's of percent before reaching the yield point.

In general, the single conductive element 30 may be in the form of a metallic wire, foil, ribbon or conductive polymer. Since the excited conductive element acts as an antenna radiating the RF tone into the cable surroundings, in some applications it is adequate to utilize such a cable 8 with only a single conductor.

In a further example, FIG. 7-D illustrates a cable including one conductive element attached to the isthmus joining the two circular cross section constituent cables of this duplex zipcord cable 8. The metallic wire 30-2 may be attached to the cable 8 by use of adhesive 20 lining the channel. For example, this adhesive is a flexible, low viscosity cyanoacrylate or a fusible, thermoplastic or "hot melt" coating which bonds the metallic wire to the longitudinally extended pocket. FIG. 7-E illustrates a cable whose jacket surface is coated over a substantial fraction of its outer surfaces with a thermoplastic adhesive. For example, such thermoplastic adhesives may be formulated to remain non-tacky at temperatures as high as 85 C while softening at 125-150 C. Suitable fusible thermoplastic adhesive coatings are available from manufacturers such as 3M Inc., Eastman Chemical and Cieba Geigy Inc. In a particular example, the coating 20-3 is 25 to 50 microns thick and the copper wire diameter 30-2 is 75 microns in diameter. Since the thickness of the wire is greater than the nominal thickness of the coating, the top surface of the copper wire 30-2 remains substantially uncoated, thereby enabling non-invasive electrical contact at any location along the length of the cable 8.

EXAMPLE

Simplex Traceable Fiber Optic Cable

In a further example of the traceable cable, simplex fiber optic cables are provided with a protective jacket of nominally circular cross section that is physically channelized along the entire longitudinal extent of the cable 8 (FIG. 7-F). The channel includes a partially exposed conductive element 30-2 longitudinally continuous along the cable length. Similarly, FIG. 7-G illustrates such a cable 8 with a pair of conductive elements 30-1 and 30-2. In a further example, the channels follow spiral paths about the outer surface of the jacket. The placement of conductors within spiral channels mitigates the accumulation of excessive tensile or compressive forces which would otherwise arise for straight channels.

EXAMPLE

Traceable Fiber Optic Ribbon Cable

FIG. 7-H illustrates a further embodiment of the traceable cable incorporating a multi-fiber 10' ribbon cable within the channelized jacket. This traceable fiber optic ribbon cable 8 includes, for example, twelve optical fibers embedded within a kapton ribbon, the ribbon surrounded on all sides by strengthening fibers 12 within the plenum of elongated cable jacket 14. Conductive elements 30-1, 30-2 are similarly embedded within concave channels 18 longitudinally coextensive with the optical fibers.

EXAMPLE

Cable Fabrication Process

The fabrication of composite fiber optic cable structures in accordance with this invention may utilize a process of coextrusion, in which the conductive wires, jacket material, aramid fiber and coated optical fiber are extruded together. Alternatively, a continuous strip of conductive foil or ink can be applied to the cable through a hot stamping process similar to that utilized to print identifiers onto the cable jacket. Hot stamping is a process whereby a stamping die is heated and forced against the cable jacket with a conductive material sandwiched in between. The material may be in the form of ink or foil, which is left behind in the regions where the heated die contacts the cable. The stamping temperature is typically between 100 and 205 degrees C. and the stamping pressure is typically between 0-6 bar.

In an alternate example, thermoplastic or "hot-melt" adhesive may be applied to the cable jacket by coating, spraying or laminating with a dry film adhesive or a thermoplastic filament. For example, a fusible monofilament comprised of low melt co-polyamide (nylon) or co-polyester (polyester) may be melted within the concave channel(s) to provide an adhesive cavity in which the conductive elements can be subsequently bonded by application of pressure and heat. Such fusible yarns and monofilaments are produced to melt at between 60 degrees C. and 160 degrees C. For example, Emser Industries supplies low temperature meltable Nylon yarn. Alternatively, a dry film adhesive with or without a backing can be selected to bond a metallic material such as copper or aluminum to PVC. 3M™ bonding film 406 is an example of a flexible, light-colored, thermoplastic adhesive bonding film.

In an alternate embodiment, the tone traceable cable is produced by bonding one or two wires within the cable groove(s) using a low viscosity (<5 cps) cyanoacrylate adhesive which is dispensed by an in-line system while the bulk cable is feed through at high speed. Suitable adhesive has a typical cure time of 1-10 seconds and can be accelerated by maintaining an elevated humidity level in the vicinity of the cable reel. A sufficiently small amount of adhesive is dispensed to prevent it from entirely covering the thin conductive element, e.g., 36 to 40 gauge copper wire. The adhesive's viscosity is sufficiently low that the adhesive preferentially wicks between the wire and the cable jacket, leaving a longitudinally extended portion of the copper wire exposed and free of adhesive.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. In an electronic system used within a communication network which has fiber optic cables interfacing a central patching unit at proximal ends of the cables and remote transmission equipment at distal ends of the cables, an arrangement for determining and updating inventories of physical fiber optic cable connections in the network, the arrangement comprising:

a multiplicity of composite fiber optic cables each having a jacket with at least one internal plenum and extending between the proximal and distal ends, each cable receiving at least one optical fiber within the jacket, and also including at least one conductive element along its length, and further including first fiber optic connectors at the proximal ends thereof, and second fiber optic connectors at the distal ends thereof, wherein each first fiber optic connector includes a first electrical antenna element;

each second fiber optic connector includes a second electrical antenna element, each first and second antenna element being coupled to a corresponding electrical conductive element for efficiently coupling electromagnetic signals bi-directionally along the conductive element between the proximal and the distal ends of the fiber optic cables; and wherein each first fiber optic connector optically interfaces a different one of the cables to the central patching unit, and each first electrical elements each inductively couples a different one of the cables to the central patching unit;

a number of passive radio frequency identification tag sources, each tag source disposed adjacent a different one of the second fiber optic connectors in the communication network, each tag source being electromagnetically coupled to a corresponding second antenna element thereof, and each tag source including a tag antenna element and an integrated circuit responsive to a received alternating electrical signal and emitting a characteristic electromagnetic signature for that connection in the network; and an electronic control unit with reader antenna elements coupled to the first electrical antenna elements of composite fiber optic cables at their proximal ends for transmission of signals along the cables to their distal ends, said control unit including a transmission subsystem for addressing and launching excitation voltage signals of radio frequency onto the proximal end of any selected conductive element, said excitation signals being of sufficient strength at least one of the second electrical antenna elements to energize the corresponding passive radio frequency identification tag source at the addressed second fiber optic connector in the network such that the tag source emits a characteristic electromagnetic signature for bi-directional transmission via the tag source, second and first electrical antenna elements back to the connector at the proximal end for reception by the electronic control unit, whereby electromagnetic signatures as to a status of the remote transmission equipment thereat can be identified and correlated with an inventory of physical fiber optic connections.

2. An electronic system in accordance with claim 1, wherein the characteristic electromagnetic signature is in a frequency range from 1 KHz to 10 GHz and wherein each radio frequency identification tag has a unique electronic identifier.

3. A fiber optic patch cable system for use in circuits, in which couplings are made between a first end point and a second end point, the system transmitting an optical signal and an electrical signal between said end points, wherein the couplings at the end points comprise connectors terminating at the first end point and at the second end point and providing low loss transmission of the optical signal to a mating connection, the system also including an electrical coil means for efficiently radiating the electrical signal into free space at the first end point and at the second end point to extend a readout range of a radio frequency identification tag responsive to the electrical signal, the system comprising:

a length of a composite fiber optic cable joining the two end points, the composite fiber optic cable including at least one optical fiber and at least one electrical conductor, both the at least one optical fiber and conductor lying co-extensively along the length of the cable;

a first connector at the first end point of the cable, the first connector having a ferrule with internal optical contacts, the ferrule circumferentially surrounding one or more optical fibers, the first connector including a first electrical coil with electrical contacts attached to the electrical conductor thereby enabling both low loss transmission of the optical signal across a connection interface and connection of the electrical signal to an external RF identification tag reader;

a terminating connector disposed at the second end point of the cable and including a second ferrule having internal optical contacts and circumferentially surrounding the one or more optical fibers, the terminating connector including a second electrical coil attached to the one or more electrical conductors, such that the optical contacts of the second ferrule enable the low loss transmission of optical signals and the first and second electrical coils produce time-varying electromagnetic fields in a vicinity of the connectors of sufficient strength at the first connector to wirelessly couple to and read out a unique electronic signature of a radio identification tag situated in a vicinity of the terminating connector.

4. A patch cable system in accordance with claim 3, wherein the electrical coil means comprises a flexible, elastomeric boot surrounding the cable at a location where an end point of the cable enters a housing body of the connector.

5. A patch cable system in accordance with claim 4, wherein the elastomeric boot is molded about an electrical coil wire comprising the coil and a diameter of the wire is in the range of 0.2-0.5 mm.

6. A system for tracing locations of electronic units that process signals from optical waveguides, the units being separately identified by passive radio frequency identification (RFID) tags proximate thereto, the system further including a multiplicity of optical fiber lines coupled individually to different units at distal locations from the system and having connectors at each end, the system comprising:

a plurality of conductive elements, each disposed along a length of a different one of the optical fiber lines, but separate therefrom along the length thereof to the distal locations;

a plurality of electrical coils each individually disposed on, and electrically coupled, to a distal end of a different one of the plurality of conductive elements;

a central operating system comprising an electric power transmitter and a multiplexer coupling the transmitter separately to each conductive element;

a plurality of passive electrical coil circuits each coupled to a different one of the conductive elements at a distal location and including a different RFID tag thereat and responsive thereto, the power transmitted from the central operating system being sufficient to excite the passive RFID tags and to generate an identification response of sufficient power to be returned bi-directionally to the central operating system as to a unit status at that distal location wherein the central operating system further includes a radio frequency tag reader coupled to the multiplexer system for receiving the returned RFID tags and establishing a status of each unit in an inventory.

7. A system as set forth in claim 6 above, wherein the conductive elements are disposed along associated optical fiber lines in configurations which present external surface segments of a conductive material therealong, and wherein the system includes a probe means for engaging the surface conductive segments to excite RF signals therein at selected locations along the lengths of the lines.

8. A system as set forth in claim 6 above, wherein the transmitter exciting the conductive elements provides a power output of more than 0.5 dB per km of cable, and wherein a return signal from the RFID tag is less than 0.05 mW.

9. A miniaturized signal exchange circuit for use in enabling individual RF queries and responses to be provided on each of a plurality of individual conductors disposed along with individual different optical fiber cables with connectors, the signal exchange circuit comprising:

a common source providing RF signals in a network coupled by different conductors to remote terminals;

an individual RFID tag for each remote terminal;

a source antenna element connected to the common source through a source conductor pair and an electronic multiplexer;

a first antenna element of a diametrical dimension compatible with an optical fiber connector to which it is attached and receiving an RF signal when in proximity to the source antenna;

a second antenna element of a diametrical dimension compatible with the optical fiber connector to which it is attached and connected to the first antenna element through the conductor pair disposed longitudinally along an optical fiber cable;

a remote antenna element positioned at a selected remote terminal adjacent to and in an operative signal coupling relation with the second antenna element when in proximity to one another, the remote antenna element being compatible in dimension with the source antenna element, and an integrated circuit element adjacent to and electrically coupled to the remote antenna element and deriving power therefrom in response to signals propagated sequentially through the source antenna element to the first antenna element and conducted to the second antenna element, the signals exceeding a selected threshold level so as to generate a unique electronic identifier signal propagating back sequentially through the remote antenna element to the second antenna element, conducted to the first antenna element and propagated to the source antenna element, thereby returning the unique electronic identifier signal to the common source to provide a response to an individual RF query.

10. A circuit in accordance with claim 9, wherein the source, first, second and remote antenna elements have a co-axial loop configuration.

11. A circuit in accordance with claim 9 above, wherein the RF signal received by the first antenna element is at a frequency of approximately 125 kHz and wherein the antenna elements are miniaturized by selecting an inductance in the range from 0.1 to 10 mili-Henries and a capacitance in the range from 0.1 to 10 nano-Farads.

12. A circuit in accordance with claim 9 above, wherein the RF signal received at the first antenna element is limited in power to a level sufficient to energize the integrated circuit element locally without energizing adjacent signal exchange circuits in the network.

* * * * *